United States Patent
Throssell

(10) Patent No.: US 9,015,984 B2
(45) Date of Patent: Apr. 28, 2015

(54) JIGGING APPARATUS FOR A PAIR OF FISHING RODS

(76) Inventor: John Throssell, Williams Lake (CA)

( * ) Notice: Subject to any disclaimer, the term of this patent is extended or adjusted under 35 U.S.C. 154(b) by 896 days.

(21) Appl. No.: 13/150,984

(22) Filed: Jun. 1, 2011

(65) Prior Publication Data
US 2011/0232155 A1 Sep. 29, 2011

Related U.S. Application Data

(63) Continuation-in-part of application No. 11/948,324, filed on Nov. 30, 2007, now Pat. No. 8,015,746.

(51) Int. Cl.
 A01K 91/00 (2006.01)
 A01K 91/047 (2006.01)
 A01K 91/06 (2006.01)

(52) U.S. Cl.
 CPC ............. *A01K 91/047* (2013.01); *A01K 91/065* (2013.01)

(58) Field of Classification Search
 CPC ...... A01K 91/053; A01K 91/65; A01K 91/14
 USPC .............. 43/42.74, 44.83–44.85, 44.98, 27.2, 43/42.13, 43.1, 43.15
 See application file for complete search history.

(56) References Cited

U.S. PATENT DOCUMENTS

| | | | |
|---|---|---|---|
| 2,162,739 A | 6/1939 | Mindek, Jr. | |
| 2,170,788 A * | 8/1939 | Augenblick | 43/42.74 |
| 2,201,351 A | 5/1940 | Skoverski | |
| 2,222,277 A * | 11/1940 | Baker | 43/44.85 |
| 2,223,922 A | 12/1940 | Schofield | |
| 2,331,215 A * | 10/1943 | Mincenberg | 43/44.84 |
| 2,492,638 A | 12/1949 | Hickson | |
| 2,577,143 A | 12/1951 | Midland | |
| 2,592,741 A | 4/1952 | Ristine | |
| 2,791,060 A * | 5/1957 | Kender | 43/44.9 |
| 2,814,901 A | 12/1957 | Suiter | |
| 3,120,715 A * | 2/1964 | Long | 43/43.1 |
| 3,160,979 A * | 12/1964 | Bissell | 43/44.85 |
| 3,363,355 A | 1/1968 | Kellner | |
| 3,426,468 A * | 2/1969 | Hinkson | 43/42.74 |
| 3,550,305 A | 12/1970 | Santosuosso | |

(Continued)

OTHER PUBLICATIONS

Godsil, J.C., The High Seas Tuna Fishery of California, Fish Bulletin No. 51, Jan. 1938, University of California, USA.

(Continued)

*Primary Examiner* — David Parsley
*Assistant Examiner* — Danielle Clerkley
(74) *Attorney, Agent, or Firm* — Cameron IP

(57) ABSTRACT

The present invention relates to a fishing rod assembly including a pair of fishing rods each having a fishing line connected thereto, and a jigging apparatus. The jigging apparatus has a v-shaped spreader bar with a first connection point and a second connection which are both upper in use and configured to operatively connect with respective ones of the fishing lines. An L-shaped elongate member pivotally connects to the spreader bar via a third connection point. The elongate member has a weight-connecting portion extending downwards, when in use, relative to the first connection point and the second connecting point, and a hook-connecting portion extending laterally outwards, when in use, relative to the weight-connecting portion. A weight operatively connects to the weight-connecting portion of the elongate member. A hook operatively connects to the hook-connecting portion of the elongate member.

14 Claims, 3 Drawing Sheets

(56) References Cited

U.S. PATENT DOCUMENTS

| | | |
|---|---|---|
| 3,745,692 A | 7/1973 | McGee |
| 3,805,438 A | 4/1974 | McLaughlin |
| 3,943,652 A | 3/1976 | Aunspaugh |
| 4,033,065 A * | 7/1977 | Shannon ............ 43/42.13 |
| 4,221,068 A * | 9/1980 | Roemer, Jr. ............ 43/43.12 |
| 4,388,774 A * | 6/1983 | Thoemke ............ 43/21.2 |
| 4,998,374 A | 3/1991 | Barnett |
| 5,113,614 A | 5/1992 | Morita |
| 5,222,317 A | 6/1993 | Georgescu |
| 5,267,409 A | 12/1993 | Voss |
| 5,444,936 A | 8/1995 | McDonald |
| 5,797,209 A | 8/1998 | Nicholas |
| 5,887,380 A * | 3/1999 | Matlock ............ 43/42.74 |
| 6,000,166 A | 12/1999 | Kirkpatrick |
| 6,618,980 B1 | 9/2003 | De Boer, Jr. |
| 6,862,838 B1 | 3/2005 | Gibbs |
| 6,928,767 B1 | 8/2005 | Bolt |
| 7,654,031 B2 * | 2/2010 | Osborn et al. ............ 43/43.12 |
| 2008/0060254 A1 | 3/2008 | Bloomfield |

OTHER PUBLICATIONS

Trophy Time Tackle Lucky Leaders Moniptilamerit Halibut Fishing Leaders, wwvv.trophytimetackle.com, publication date unknown.
Bait Boats 4, two Pole Yellowfin.jpg, Historic Fishing, www.test.astoria.k12.or.us/galley/view_photo.php?set_albu . . . (?), publication date unknown.
"Tuna Fishing 1940's Pt. 1", http:www.youtube.com/watch?v=tM193Mg8rtBM&feature=related, Time 4:09-4:29.
"Tuna Fishing 1940's Pt. 2", http:www.youtube.com/watch?v=xsybqHEdKA&feature=related, Time: 0:00-0:42.

\* cited by examiner

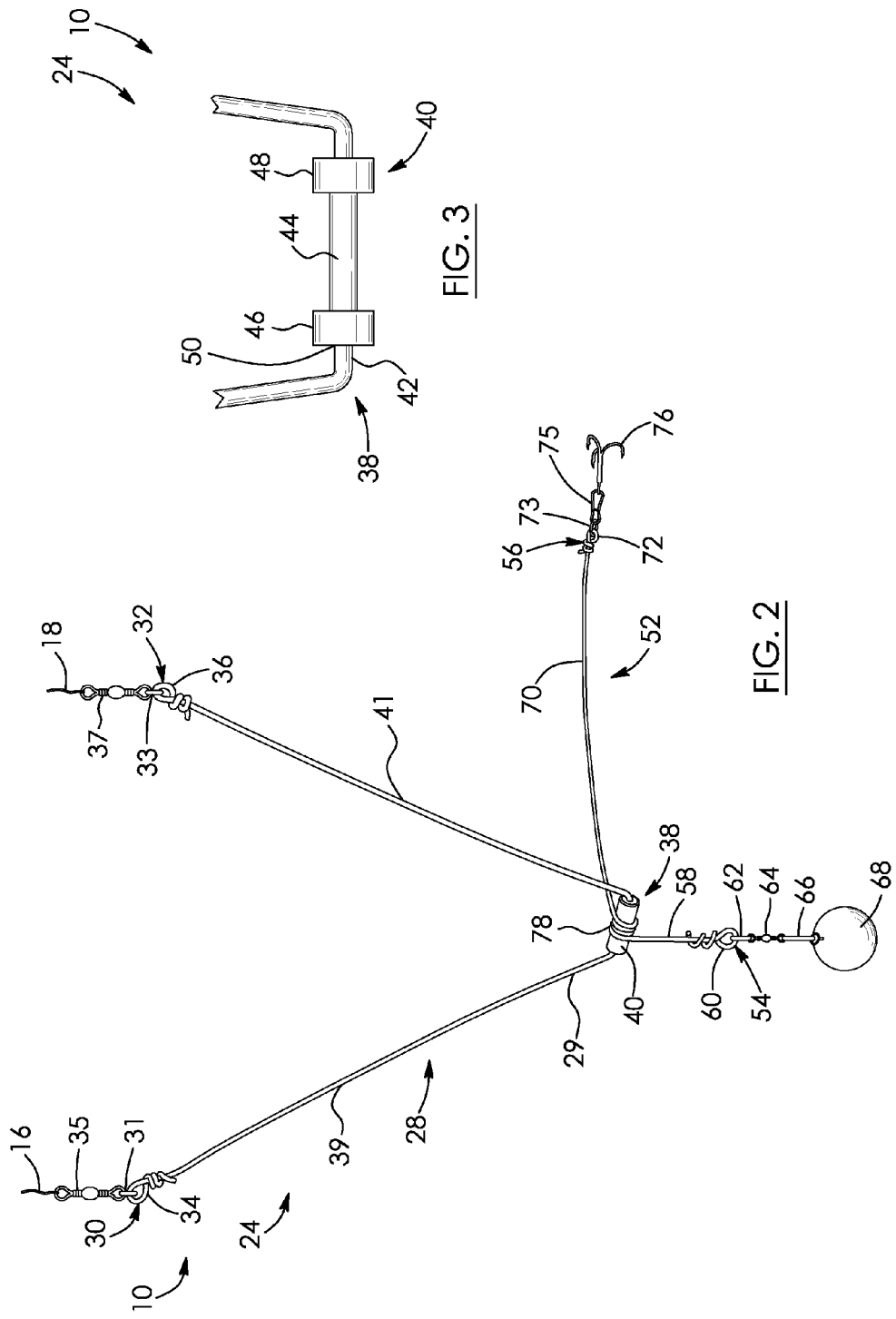

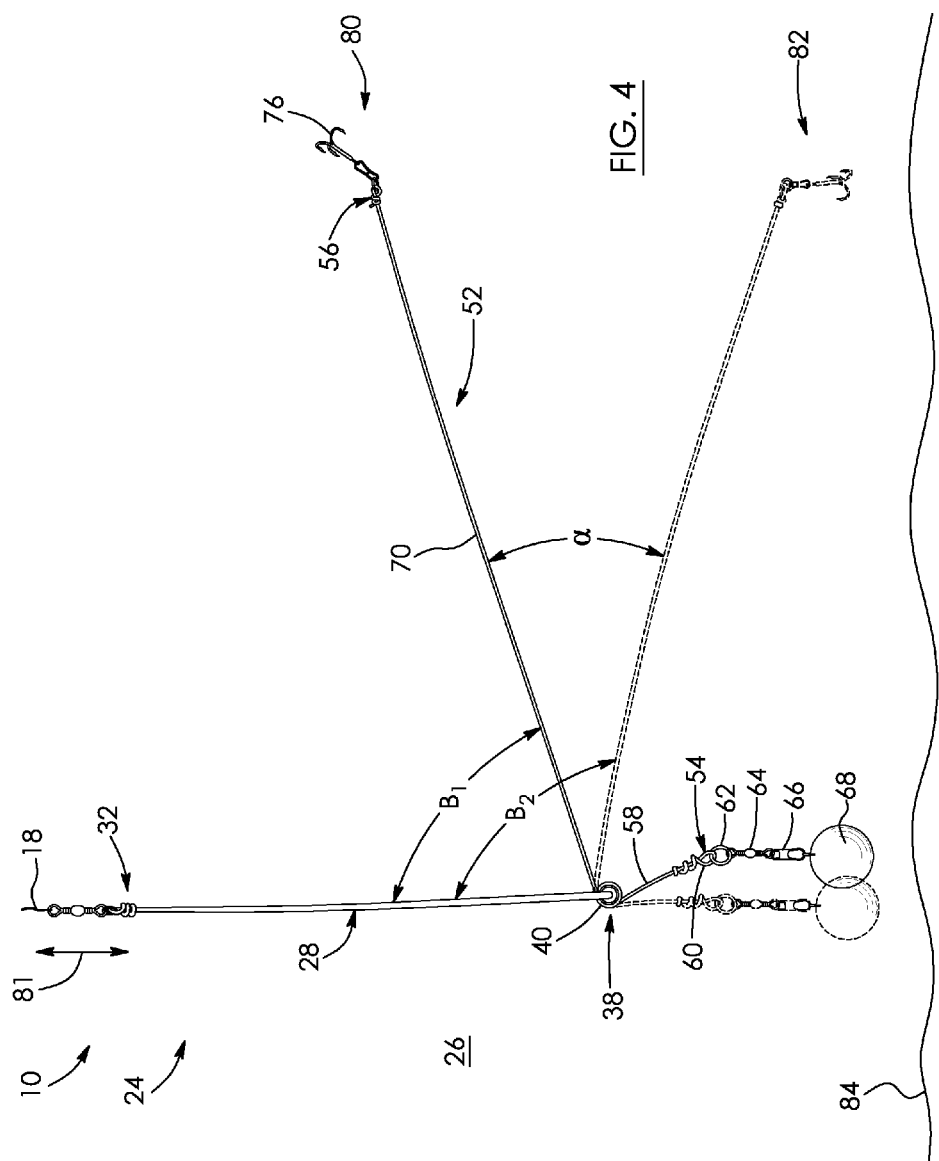

JIGGING APPARATUS FOR A PAIR OF FISHING RODS

CROSS REFERENCE TO RELATED APPLICATION

This application is a continuation-in-part of U.S. patent application Ser. No. 11/948,324 filed in the United States Patent and Trademark Office on Nov. 30, 2007, the disclosure of which is incorporated herein by reference and priority to which is claimed.

FIELD OF THE INVENTION

The present invention relates to a jigging apparatus. In particular, the invention relates to a jigging apparatus for a pair of fishing rods.

DESCRIPTION OF THE RELATED ART

Fishing with a single fishing rod and a single fishing line may provide a number of drawbacks. If a fish is particularly large, it can be very difficult for a single person to reel in. If the single fishing line breaks, the fish often escapes capture.

It is known per se to provide a fishing device that connects a pair of fishing rods together. For example, in two-pole tuna fishing, two fishing lines from two separate fishing rods are attached through swivels to a common ring to which a snell and hook are fastened.

Also, U.S. patent application Ser. No. 11/948,324 to Throssell discloses a fishing device for a pair of fishing rods, the fishing device having a v-shaped spreader bar adapted to remain streamline in the water so as to inhibit entanglement when trolling, for example.

However, the above described devices may be of limited use for large bottom-feeding fish, such as halibut, which are not readily caught in the open water by way of casting or trolling.

There is accordingly a need for a fishing device that connects together the fishing lines of a pair of fishing rods and which is particularly adapted for jigging and catching large bottom-feeding fish.

BRIEF SUMMARY OF INVENTION

The present invention provides a jigging apparatus disclosed herein that overcomes the above disadvantages. It is an object of the present invention to provide an improved jigging apparatus.

There is accordingly provided a fishing rod assembly. The assembly includes a pair of fishing rods each having a fishing line connected thereto, and a jigging apparatus. The jigging apparatus has a v-shaped spreader bar with a first connection point and a second connection which are both upper in use. The first connection point and the second connection point are configured to operatively connect with respective ones of the fishing lines. The jigging apparatus has a third connection point which is lower in use, spaced-apart from and interposed between the first connection point and the second connection point. The jigging apparatus has an L-shaped elongate member pivotally connecting to the spreader bar via the third connection point. The elongate member has a weight-connecting portion extending downwards, when in use, relative to the first connection point and the second connection point of the spreader bar. The elongate member has a hook-connecting portion extending laterally outwards, when in use, relative to the weight-connecting portion. The jigging apparatus has a weight operatively connected to the weight-connecting portion of the elongate member. The jigging apparatus has a hook operatively connected to the hook-connecting portion of the elongate member.

There is also provided a jigging apparatus for a pair of fishing rods each having a fishing line connected thereto. The jigging apparatus has a spreader bar with a first connection point configured to operatively connect with a first one of the fishing lines and a second connection point spaced-apart from the first connection point. The second connection point is configured to operatively connect with a second one of the fishing lines. The jigging apparatus has an elongate member pivotally connected to the spreader bar and extending outwards therefrom. The jigging apparatus has a hook operatively connected to the elongate member, whereby, jigging of the apparatus causes selective pivoting of the elongate member and thus movement of the hook, attracting and enticing fish to bite the hook thereby.

There is further provided a method of making a jigging apparatus for connecting together respective fishing lines of a pair of fishing rods to a single hook. The jigging apparatus has a first wire with spaced-apart ends, a second wire with spaced-apart ends, a hook and a weight. The method includes the step of twisting the ends of the first wire so as to form looped portions for connecting to the fishing lines. The method includes coiling a portion of the second wire around the first wire at a midway point of the first wire such that the second wire has a hook-connecting portion extending horizontally from the first wire and a weight-connecting portion extending downwardly from the first wire. The method includes connecting the hook to the hook-connecting portion and connecting the weight to the weight-connecting portion.

BRIEF DESCRIPTION OF DRAWINGS

The invention will be more readily understood from the following description of preferred embodiments thereof given, by way of example only, with reference to the accompanying drawings, in which:

FIG. 2 is a perspective view of the jigging apparatus shown in FIG. 1, the apparatus having a spool-like member;

FIG. 3 is a front elevation view of the spool-like member shown in FIG. 2; and

FIG. 4 is a side elevation view of the jigging apparatus shown in FIG. 2, the jigging apparatus having an elongate member in a first position as shown in solid lines, and the elongate member also having a second position angularly spaced-apart from the first position and which is shown in ghost.

DESCRIPTION OF THE PREFERRED EMBODIMENTS

Figure 1:
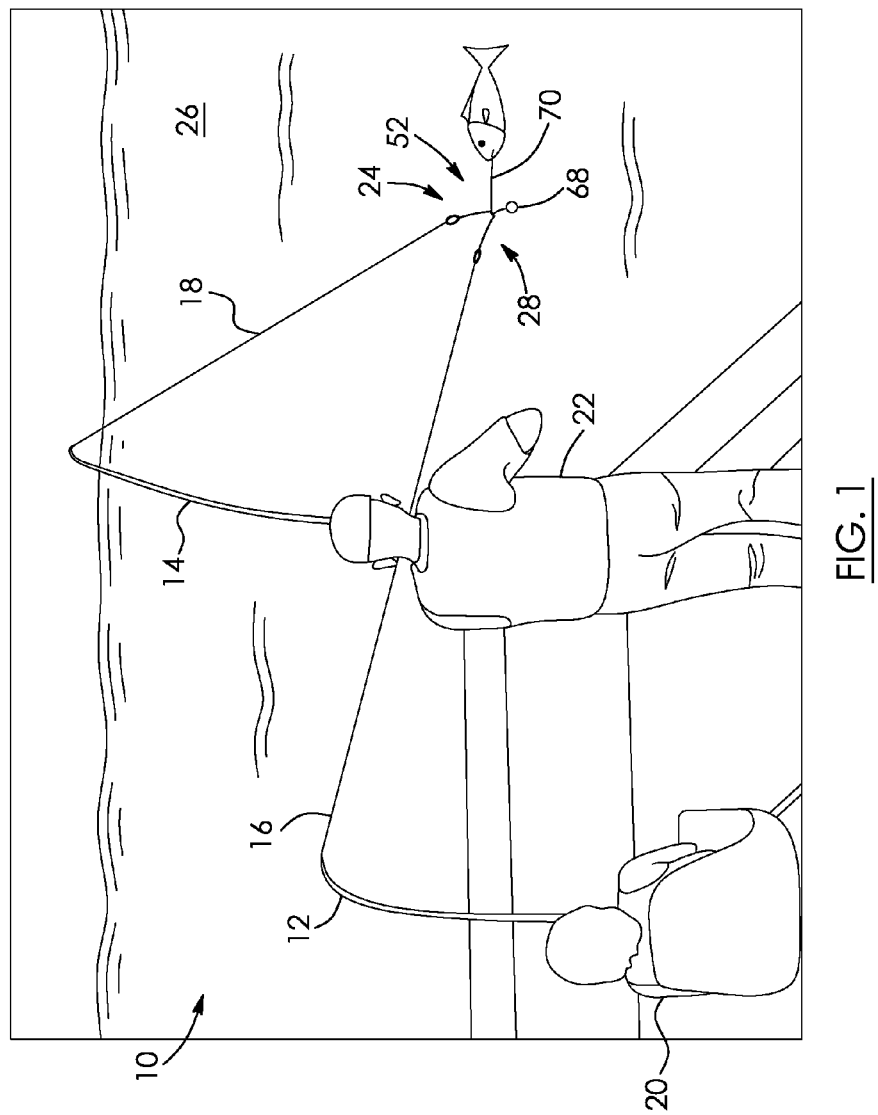
FIG. 1 is a perspective view of a fishing rod assembly with a jigging apparatus, the assembly being illustrated in use by two fishers.

Referring to the drawings and first to FIG. 1, there is shown a fishing rod assembly 10. The assembly includes a pair of fishing rods 12 and 14 having fishing lines 16 and 18, respectively, connected thereto. Rod 12 is operated by a first fisher 20 and rod 14 is operated by a second fisher 22.

The fishing rod assembly 10 includes a jigging apparatus 24 in this example shown partially disposed with a body of water 26.

Referring to FIG. 2, the jigging apparatus includes a spreader bar 28 that is v-shaped in this example. Spreader bar 28 is made of wire in this example having spaced-apart ends.

The spreader bar 28 has a first arm 39 and a second arm 41 angularly spaced-apart relative to the first arm. The arms are aligned in the same plane.

The spreader bar has a first connection point 30 and a second connection point 32 on the arms 39 and 41, respectively, and which are upper in use. Connection points 30 and 32 operatively connect with respective ones of the fishing lines 16 and 18. In particular, spreader bar 28 has twisted looped portions 34 and 36 at its connection points for operatively connecting with the fishing lines. The looped portions are formed by twisting the wire around connection point 30 and twisting around connection point 32. The apparatus 24 includes a pair of annular eyelets 31 and 33 connected to the looped portions 34 and 36, respectively and a pair of conventional swivels 35 and 37 connected to the eyelets, respectively. The fishing lines 16 and 18 connect to the looped portions via the swivels and eyelets.

The spreader bar 28 has a third connection point 38 which is lower than connection points 30 and 32 in use. The third connection point of the spreader bar is spaced-apart from and interposed between the connection points 30 and 32 of the spreader bar.

As best shown in FIG. 3, the jigging apparatus 24 has a wire portion 42 disposed at the third connection point 38 of the spreader bar. Portion 42 is located at a midway point of the spreader bar. The jigging apparatus has a spool-like member 40 that extends around portion 42 of the spreader bar in this example. However, the spool-like member is not strictly required. Spool-like member 40 is dumbbell-shaped, with a cylindrical portion 44, spaced-apart enlarged cylindrical end portions 46 and 48, and a central aperture 50. The central aperture extends from end 46 to end 48. Wire portion 42 extends through aperture 50. The spool-like member is pivotally rotatable relative to the spreader bar 28 about portion 42 thereof.

Referring back to FIG. 2, the jigging apparatus 24 has an elongate member 52 which is L-shaped in this example, with a weight-connection portion 58 and a hook-connecting portion 70. The hook-connecting portion and the weight-connecting portion are angularly spaced-apart relative to each other at an angle approximately equal to 90 degrees by bending the portions relative to each other. The elongate member is made of wire and is resilient. Elongate member 52 has a pair of spaced-apart ends 54 and 56. End 54 is lower than end 56 in use and end 56 is laterally disposed in use.

The weight-connecting portion 58 extends downwards, when in use, relative to the connection points 30 and 32 of the spreader bar. The weight-connecting portion extends from connection point 38 of the spreader bar to end 54 of the elongate member. Weight-connecting portion 58 extends downwards from the spool-like member 40. The elongate member 52 has a looped portion 60 formed by twisting around end 54.

The jigging apparatus 24 has an annular eyelet 62, best seen in FIG. 4, connected to looped portion 60, a swivel 64 connected to the eyelet, a spring clip 66 connected to the swivel and a weight 68 connected to the spring clip. The weight is thus operatively connected to the weight-connecting portion 58 of the elongate member.

The hook-connecting portion 70 extends generally horizontally relative to the weight-connecting portion 58 when in use. Referring back to FIG. 2, the hook-connecting portion extends from connection point 38 of the spreader bar 28 to end 56 of the elongate member. Hook-connecting portion 70 extends horizontally from the spool-like member 40. The hook-connecting portion is greater in length than weight-connecting portion 58 in this example. The elongate member 52 has a further looped portion 72 formed by twisting portion 70 around end 56. The jigging apparatus 24 has an annular eyelet 73 connected to the looped portion, a spring clip 75 connected to the eyelet, and a hook 76 connected to the spring clip. Thus, the hook operatively connects to the hook-connecting portion of the elongate member.

The elongate member 52 pivotally connects to the spreader bar 28 and extends outwards therefrom. In this example, the elongate member pivotally connects to the spreader bar by a coiled portion 78 of the elongate member which extends around wire portion 42 of the spreader bar shown in FIG. 3 and, in particular, portion 78 coils around the spool-like member 40 as best shown in FIG. 2.

The apparatus 24 as herein described is particularly adapted for jigging. In operation and referring to FIG. 4, the fishers may bait hook 76 or connect onto looped end 72 an artificial fishing lure adapted to encourage fish to bite the hook. Next, the fishers lower the apparatus towards bottom 84 of the body of water 26 through the aid of weight 68. Jigging the apparatus is done by raising the device upwards by pulling upwards on the fishing rods, then letting the apparatus sink via gravity such that weight 68 is at or adjacent to the bottom, and then repeating this process, as indicated by arrows 81. The elongate member 52 pivots from a first position 80 where the hook 76 is disposed above the connection point 38 of the spreader bar 28 to a second position 82, shown in ghost, where the hook is disposed below the connection point 38 of the spreader bar and where the weight 68 abuts bottom 84. In the second position, the hook 76 is disposed above the weight 68. Advantageously, the elongate member is thus configured such that the hook remains above the bottom of the body of water.

The second position 82 of the weight-connecting portion 70 is angularly spaced-apart from the first position 80 of the weight-connecting portion 70 by an angle $\alpha$ which is equal to between 0 and 35 degrees in this example. The hook-connecting portion 70 of the elongate member is configured to remain angularly spaced-apart from the spreader bar by an angle $\beta$ in the range of 70 to 105 degrees ($\beta_1$ to $\beta_2$) relative to the spreader bar. Advantageously, this targeted angular displacement and motion caused by jigging of the apparatus as herein described may attract the attention of bottom-dwelling fish and entice the fish to bite the hook. Portion 70 is elongate and thus shaped so as to be spaced-apart from spreader bar 28 and weight 68, which may otherwise discourage fish from biting at the hook 76.

It will be appreciated that many variations are possible within the scope of the invention described herein. It will also be understood by someone skilled in the art that many of the details provided above are by way of example only and are not intended to limit the scope of the invention which is to be determined with reference to the following claims.

What is claimed is:

1. A fishing rod assembly comprising a pair of fishing rods each having a fishing line connected thereto, and a jigging apparatus comprising:

a v-shaped spreader bar with a first connection point and a second connection point which are both upper in use, the first connection point and the second connection point being configured to operatively connect with respective ones of the fishing lines, and a third connection point which is lower in use, spaced-apart from and interposed between the first connection point and the second connection point;

an L-shaped elongate member pivotally connecting to the spreader bar via the third connection point, having a weight-connecting portion connected to and extending downwards from the third connection point, when in use, relative to the first connection point and the second connecting point of the spreader bar and having a hook-connecting portion connected to and extending laterally outwards from the third connection point, when in use, relative to the weight-connecting portion;

a weight connected to the weight-connecting portion of the elongate member;

a hook connected to the hook-connecting portion of the elongate member; and a plurality of swivels, the fishing lines connecting to the first connection point and the second connection point of the spreader bar via respective ones of the swivels and the weight connecting to the elongate member via a further respective one of the swivels.

2. The assembly as claimed in claim 1, further including a spool-like member disposed at the third connection point of the spreader bar, the elongate member pivotally connecting to the spreader bar by being coiled around the spool-like member.

3. The assembly as claimed in claim 1 wherein, upon jigging the apparatus, the elongate member is configured to pivot from a first position where the hook is disposed above the third connection point of the spreader bar to a second position where the hook is disposed below the third connection point of the spreader bar.

4. The assembly as claimed in claim 3, the apparatus being configured for jigging adjacent to a bottom of a body of water and wherein the hook is disposed above the weight when the elongate member is in the second position, the elongate member thus being configured such that the hook remains above from the bottom of the body of water.

5. The assembly as claimed in claim 1 wherein, upon jigging the apparatus, the elongate member is configured to pivot from a first position to a second position angularly spaced-apart from the first position, angular motion being caused thereby for attracting and enticing fish to bite the hook.

6. The assembly as claimed in claim 5, wherein the second position is angularly spaced-apart from the first position by an angle of 35 degrees or less.

7. The assembly as claimed in claim 1 wherein the hook-connecting portion of the elongate member is configured to remain angularly spaced-apart from the spreader bar by an angle in the range of 70 to 105 degrees relative to the spreader bar.

8. The assembly as claimed in claim 1 wherein the spreader bar has a first arm extending between a first one of the first connection point and the second connection point of the spreader bar and the third connection point of the spreader bar, and a second arm extending between a second one of the first connection point and the second connection point of the spreader bar and the third connection point of the spreader bar, the arms of the spreader bar being angularly spaced-apart relative to each other and being aligned in the same plane.

9. The assembly as claimed in claim 1, wherein the spreader bar is made of wire, wherein the apparatus further includes a spool-like member extending around the wire, the spool-like member being disposed at the third connection point of the spreader bar, the spreader bar having twisted looped portions at the first connection point and the second connection point of the spreader bar for operatively connecting with the fishing lines, and wherein the elongate member is made of wire, is coiled around the spool-like member and has twisted looped portions on the weight-connecting portion and the hook-connecting portion for the weight and hook, respectively, to operatively connect therewith.

10. The assembly as claimed in claim 1 wherein the elongate member is resilient.

11. The assembly as claimed in claim 1 wherein the hook-connecting portion of the elongate member is greater in length than the weight-connecting portion of the elongate member.

12. The assembly as claimed in claim 2, wherein the spool-like member is pivotally rotatable relative to the spreader bar.

13. The assembly as claimed in claim 2 wherein the spool-like member is dumbbell-shaped and has a central cylindrical portion, spaced-apart enlarged cylindrical ends, and a central aperture extending therethrough, and wherein the spreader bar is disposed through said central aperture.

14. The assembly as claimed in claim 1 wherein the jigging apparatus is at least partially y-shaped.

* * * * *